United States Patent
Lv et al.

(10) Patent No.: US 10,613,382 B2
(45) Date of Patent: Apr. 7, 2020

(54) BACKLIGHT MODULE AND METHOD FOR MANUFACTURING THE SAME, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhenhua Lv, Beijing (CN); Yanfeng Wang, Beijing (CN); Yuanxin Du, Beijing (CN); Yang You, Beijing (CN); Hongbo Feng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 133 days.

(21) Appl. No.: 16/066,614

(22) PCT Filed: Oct. 26, 2017

(86) PCT No.: PCT/CN2017/107878
§ 371 (c)(1),
(2) Date: Jun. 27, 2018

(87) PCT Pub. No.: WO2018/176825
PCT Pub. Date: Oct. 4, 2018

(65) Prior Publication Data
US 2020/0033678 A1 Jan. 30, 2020

(30) Foreign Application Priority Data
Mar. 27, 2017 (CN) .......................... 2017 1 0188868

(51) Int. Cl.
*G02F 1/1335* (2006.01)

(52) U.S. Cl.
CPC .. *G02F 1/133606* (2013.01); *G02F 1/133603* (2013.01); *G02F 2001/133607* (2013.01); *G02F 2001/133614* (2013.01)

(58) Field of Classification Search
CPC ......... G02F 1/133606; G02F 1/133603; G02F 2001/133614
See application file for complete search history.

(56) References Cited

U.S. PATENT DOCUMENTS

2004/0252509 A1  12/2004  Lin
2009/0190068 A1  7/2009   Kawamura
(Continued)

FOREIGN PATENT DOCUMENTS

CN  101809359 A  8/2010
CN  201795430 U  4/2011
(Continued)

OTHER PUBLICATIONS

International Search Report from PCT Application No. PCT/CN2017/107878 dated Feb. 1, 2018 (5 pages).
(Continued)

*Primary Examiner* — Joseph L Williams
*Assistant Examiner* — Jacob R Stern
(74) *Attorney, Agent, or Firm* — Dave Law Group, LLC; Raj S. Dave

(57) ABSTRACT

The embodiments of the present disclosure disclose a backlight module, a method for manufacturing the same and a display device. The backlight module comprises: a substrate and a plurality of light emitting areas provided on the substrate. The light emitting area comprises a light source and a photonic crystal structure corresponding to the light source; the photonic crystal structure is internally provided with a cavity for accommodating the corresponding light source, and at least one defect channel for connecting the
(Continued)

cavity and a surface, on a side of the photonic crystal structure away from the substrate, of the photonic crystal structure; a frequency of emergent light of each of the light sources is within a photonic forbidden band of the corresponding photonic crystal structure; extension directions of each of the defect channels are parallel to each other. The backlight module enables the light emergent to be collimated light.

20 Claims, 8 Drawing Sheets

(56) References Cited

U.S. PATENT DOCUMENTS

| | | |
|---|---|---|
| 2009/0197210 A1 | 8/2009 | Wang et al. |
| 2010/0246210 A1 | 9/2010 | Yashiro |
| 2011/0204324 A1 | 8/2011 | Kim |
| 2012/0217474 A1* | 8/2012 | Zang .................. H01L 33/06 257/13 |
| 2017/0293182 A1 | 10/2017 | Hu |

FOREIGN PATENT DOCUMENTS

| | | |
|---|---|---|
| CN | 102169939 A | 8/2011 |
| CN | 103091756 A | 5/2013 |
| CN | 104101940 A | 10/2014 |
| CN | 105353556 A | 2/2016 |
| CN | 106842710 A | 6/2017 |
| JP | 2009128823 A | 6/2009 |
| TW | 200501429 A | 1/2005 |
| TW | 200933223 A | 8/2009 |

OTHER PUBLICATIONS

Written Opinion of PCT Application No. PCT/CN2017/107878 dated Feb. 1, 2018 (4 pages).

* cited by examiner

BACKLIGHT MODULE AND METHOD FOR MANUFACTURING THE SAME, AND DISPLAY DEVICE

This application claims the benefit and priority of Chinese patent application No. 201710188868.2 filed on Mar. 27, 2017. The entire disclosure of the above application is incorporated herein by reference as a part of this application.

TECHNICAL FIELD

The present disclosure relates to the field of display technologies, and particularly, to a backlight module and a method for manufacturing the same, and a display device.

BACKGROUND

Nowadays, display products mostly use a backlight system as a light source for displaying images. The display products are, for example, liquid crystal displays, digital photo frames, e-book readers, mobile terminals, vehicle display screens and stereoscopic displays.

Among them, Liquid Crystal Display (LCD) used as a display device has become the mainstream in the field of flat panel displays. The display of LCD is realized by an electric field formed by two pieces of conductive glass driving liquid crystals therebetween. Since liquid crystal itself does not emit light, the LCD needs an external light source to achieve transmissive or reflective display. Most existing LCDs are transmission type, for which the backlight module is an indispensable part.

SUMMARY

The embodiments of the present disclosure provide a backlight module and a method for manufacturing the same, and a display device.

The embodiments of the present disclosure provide a backlight module, comprising: a substrate and a plurality of light emitting areas provided on the substrate, wherein, the light emitting area comprises a light source and a photonic crystal structure corresponding to the light source;

the photonic crystal structure is internally provided with a cavity for accommodating a corresponding light source, and at least one defect channel for connecting the cavity and a surface, on a side of the photonic crystal structure away from the substrate, of the photonic crystal structure;

a frequency of emergent light of each of the light sources is within a photonic forbidden band of a corresponding photonic crystal structure;

extension directions of each of the defect channels are parallel to each other.

In a possible implementation, in the backlight module provided by the embodiments of the present disclosure, the extension direction of the defect channel is perpendicular to a surface of the substrate.

In a possible implementation, in the backlight module provided by the embodiments of the present disclosure, a size of an opening, on a side of the defect channel away from the substrate, of the detect channel is less than about 3 km.

In a possible implementation, in the backlight module provided by the embodiments of the present disclosure, a cross-sectional area of at least a part of the cavity in a direction parallel to the substrate is gradually decreased in a direction away from the substrate.

In a possible implementation, in the backlight module provided by the embodiments of the present disclosure, the emergent light of the light source comprises monochromatic light or compound light.

In a possible implementation, in the backlight module provided by the embodiments of the present disclosure, the light source comprises an excitation light source provided inside the cavity, and quantum dots provided on a side of a light emergent surface of the excitation light source.

In a possible implementation, in the backlight module provided by the embodiments of the present disclosure, the quantum dots comprise quantum dots that emit monochromatic light or quantum dots that emit compound light.

In a possible implementation, in the backlight module provided by the embodiments of the present disclosure, the excitation light source is an ultraviolet light emitting diode.

In a possible implementation, in the backlight module provided by the embodiments of the present disclosure, the defect channel is filled with a transparent material.

The embodiments of the present disclosure further provide a method for manufacturing the backlight module, comprising:

forming a plurality of light sources corresponding to respective light emitting areas on a first substrate; and forming photonic crystal structures corresponding to the respective light emitting areas on the first substrate and forming a cavity for accommodating a corresponding light source and at least one defect channel inside each of the photonic crystal structures, wherein, the defect channel is configured to connect the cavity and a surface, on a side of the photonic crystal structure away from the first substrate, of the photonic crystal structure, and extension directions of each of the defect channels are parallel to each other;

a frequency of emergent light of each of the light sources is within a photonicforbidden band of a corresponding photonic crystal structure.

In a possible implementation, in the method provided by the embodiments of the present disclosure, forming photonic crystal structures corresponding to the respective light emitting areas on the first substrate, and forming a cavity for accommodating the corresponding light source and at least one defect channel inside each of the photonic crystal structures comprises:

forming photonic crystal structures corresponding to the respective light emitting areas on a second substrate;

forming a cavity corresponding to a respective one of the light sources, on a side of each of the photonic crystal structures away from the second substrate and at a position corresponding to the respective one of light sources;

joining the first substrate with the second substrate and removing the second substrate after the joining;

forming at least one defect channel corresponding to a respective one of the cavities, on a side of each of the photonic crystal structures away from the first substrate and at a position corresponding to the respective one of the cavities.

In a possible implementation, in the method provided by the embodiments of the present disclosure, forming photonic crystal structures corresponding to the respective light emitting areas on the first substrate, and forming a cavity for accommodating the corresponding light source and at least one defect channel inside each of the photonic crystal structures comprises:

forming photonic crystal structures corresponding to the respective light emitting areas on a second substrate;

forming a cavity corresponding to a respective one of the light sources, on a side of each of the photonic crystal structures away from the second substrate and at a position corresponding to the respective one of the light sources;

forming at least one defect channel for connecting the cavity and the second substrate in each of the photonic crystal structures;

joining the first substrate with the second substrate and removing the second substrate after the joining.

In a possible implementation, in the method provided by the embodiments of the present disclosure, forming photonic crystal structures corresponding to the respective light emitting areas on a second substrate comprises:

forming photonic crystal structures formed by at least two materials with different refractive indexes alternately arranged in a one-dimensional direction at a specific cycle on the second substrate.

In a possible implementation, in the method provided by the embodiments of the present disclosure, forming photonic crystal structures corresponding to the respective light emitting areas on a second substrate comprises:

forming photonic crystal structures formed by at least two materials with different refractive indexes alternately arranged in two-dimensional directions at a specific cycle on the second substrate.

The embodiments of the present disclosure further provide a display device, comprising the backlight module.

The embodiments of the present disclosure provide a backlight module, a method for manufacturing the same and a display device. The backlight module comprises: a substrate and a plurality of light emitting areas provided on the substrate. Wherein the light emitting area comprises a light source and a photonic crystal structure corresponding to the light source; the photonic crystal structure is internally provided with a cavity for accommodating the corresponding light source, and at least one defect channel for connecting the cavity and a surface, on a side of the photonic crystal structure away from the substrate, of the photonic crystal structure; a frequency of emergent light of each of the light sources is within a photonic forbidden band of the corresponding photonic crystal structure; extension directions of each of the defect channels are parallel to each other. In the backlight module provided by the embodiments of the present disclosure, since the frequency of the emergent light of each of the light sources is within the photonicforbidden band of the corresponding photonic crystal structure, the emergent light of each of the light sources can only emergent through the defect channel, rather than the corresponding photonic crystal structure. In addition, the extension directions of each of the defect channels are parallel to each other, which enables the light emergent from the light sources to be collimated light.

DETAILED DESCRIPTION

Figure 1:
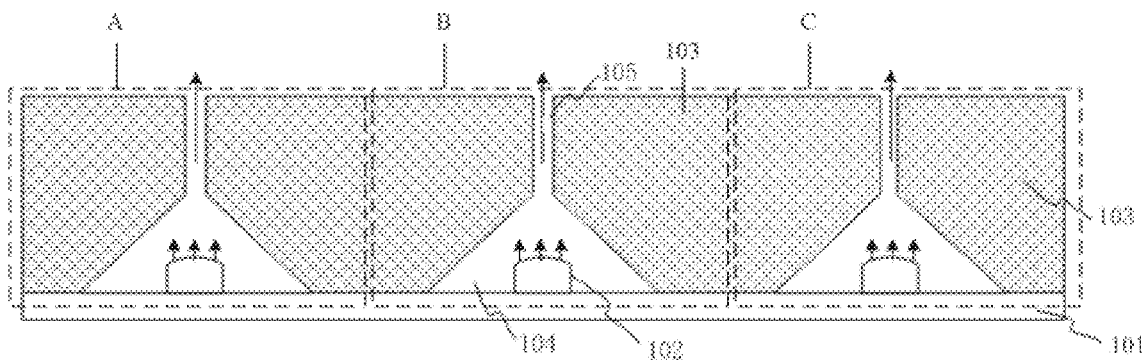
FIG. 1 illustrates a schematic diagram of a structure of a backlight module according to an embodiment of the present disclosure.

With respect to the problem in the prior art that light emergent from a backlight module has a poor collimation, the embodiments of the present disclosure provide a backlight module, a method for manufacturing the same, and a display device.

It should be noted that the following drawings and examples are not intended to limit the scope of the present disclosure. In the case where specific elements of the embodiments of the present disclosure may be partially or entirely implemented using known components (or methods or processes), only portions of the known components (or methods or processes) necessary to understand the embodiments of the present disclosure will be described, and the detailed description of other portions of the known components will be omitted so as not to confuse the present disclosure. Further, various embodiments include equivalents known at present and in the future, which are equivalent to the components concerned herein, by means of illustration.

The flowchart described in any embodiments of the present disclosure is just an example. There may be many modifications to the flowchart or the steps described therein without departing from the spirit of the embodiments of the present disclosure. For example, the steps may be performed in a different order, or the steps may be added, deleted, or amended. Those modifications are deemed as parts of the claimed aspects.

In the description of the present disclosure, the orientations or position relationship indicated by the terms "on", "above", "under", "below", "between", etc. are those illustrated based on the orientation or position relationship shown in the drawings. They are just used to facilitate and simplify the description of the present disclosure, rather than indicating or implying that any mentioned device or element must have a particular orientation, or be constructed or operated in a particular orientation, and hence cannot be understood as limitations to the present disclosure. In addition, when an element or layer is referred to as being "on" another element or layer, it may be directly located on the another element or layer, or there may be an intermediate element or layer; similarly, when an element or layer is referred to as being "under" another element or layer, it may be directly located under the another element or layer, or there may be at least one intermediate element or layer; and when an element or layer is referred to as being "between" two elements or layers, it may be an only element or layer between the two elements or layers, or there may be more than one intermediate element or layer.

Unless additionally and explicitly pointed out in the context, the singular form of the words used herein and in the appended claims includes the plural form, and vice versa. Thus, when a word is mentioned in the singular form, it usually includes the plural form. Similarly, the words "include", "comprise", "contain", "have" and grammatical variants are intended to be inclusive and mean that there may be additional elements other than the listed elements. Where the term "example" is used herein, particularly following a group of terms, it is merely exemplary and illustrative and should not be considered as exclusive or extensive. The terms "first", "second", "third" and the like are just used for description and should not be understood as indicating or implying any relative importance or formation order.

Next, the detailed implementations of the backlight module, the method for manufacturing the same, and the display device provided by the embodiments of the present disclosure will be described in detail with reference to the drawings. The thickness and shape of each film layer in the drawings do not reflect the actual scale and just intend to illustrate the content of the present disclosure.

Generally, with respect to backlight module, light emergent from backlight source is guided by a light guide plate. However, light emergent from the backlight module with such a structure has a poor collimation. The embodiments of the present disclosure provide a backlight module, a method for manufacturing the same, and a display device to solve the problem that light emergent from the backlight module has a poor collimation.

FIG. 1 illustrates a schematic diagram of a structure of a backlight module according to an embodiment of the present disclosure. As illustrated in FIG. 1, the backlight module may comprise a substrate 101, and a plurality of light emitting areas (e.g., a light emitting area A, a light emitting area B, and a light emitting area C) provided on the substrate 101, wherein, the light emitting area may comprise a light source 102, and a photonic crystal structure 103 corresponding to the light source 102;

the photonic crystal structure 103 may be internally provided with a cavity 104 for accommodating the corresponding light source 102, and a defect channel 105 for connecting the cavity 104 and a surface, on a side of the photonic crystal structure 103 away from the substrate 101, of the photonic crystal structure 103;

a frequency of emergent light of the light source 102 in each of the light emitting areas is within a photonic forbidden band of the corresponding photonic crystal structure 103;

extension directions of each of the defect channels 105 in each of the light emitting areas may be parallel to each other.

In the backlight module provided by the embodiment of the present disclosure, based on the above principle, since the frequency of the emergent light of each of the light sources 102 is within the photonic forbidden band of the corresponding photonic crystal structure 103, the emergent light of each of the light sources 102 cannot emergent through the corresponding photonic crystal structure 103. Since the channel 105 breaks the periodic arrangement of the photonic crystal structure 103, the emergent light of the light source 102 can emergent through the defect channel 105. In addition, the extension directions of each of the defect channels 105 are parallel to each other, which enables the emergent light of the respective light sources 102 to emergent in parallel after passing through the defect channels 105, so that light emergent from the backlight module is collimated.

Referring to FIG. 1, dashed boxes in FIG. 1 indicate the light emitting areas. The three light emitting areas A, B and C illustrated in FIG. 1 are merely for the convenience of illustration, and in practical applications, a plurality of light emitting areas may be uniformly provided on the substrate 101. These light emitting areas may be provided in an array or in other arrangement. The number and the arrangement of the light emitting areas is not limited in the present disclosure.

The photonic crystal structure is an optical microstructure having a dielectric constant periodically varying with space. Since the dielectric constant of the photonic crystal structure is periodically distributed, the refractive index thereof is also periodically distributed. The dispersion curves of light waves propagated in the photonic crystal structure form band-like energy band structures, and a photonic band gap, i.e., a photonic forbidden band, will occur between the energy bands. The photonic forbidden band is a frequency area. When a frequency of light falls within the frequency area, the light is totally reflected and cannot pass through the photonic crystal structure. In addition, the spontaneous emission of light and the like are also suppressed.

The photonic crystal structure is generally made of, for example, two materials in an periodically alternative arrangement. The photonic forbidden band of the photonic crystal structure can be controlled by changing the materials or the period of the alternative arrangement, so that the frequency of the light propagated in the photonic crystal structure falls within the photonic forbidden band. Thus, the light propagated in the photonic crystal structure cannot pass through the photonic crystal structure.

According to the embodiment of the present disclosure, since the refractive index of the defect channel 105 may be different from that of the photonic crystal structure 103 in the corresponding light emitting area, the periodic arrangement of the photonic crystal structure 103 is broken. According to the embodiment of the present disclosure, the defect channel 105 may be filled with any material having a refractive index which different from that of the photonic crystal structure 103 in the corresponding light emitting area. For example, the defect channel 105 may be filled with air or a transparent material, and it also may be filled with a material having any other refractive index. The present disclosure does not limit the material that the defect channel 105 filled with.

According to the embodiment of the present disclosure, referring to FIG. 1, a cross-section of the defect channel 105 in a direction perpendicular to the substrate 101 may be a stripe. An opening of the defect channel 105 in FIGS. 1 and 2 may be provided to be always uniformly in a direction away from the substrate 101. It should be understood that in practical applications, the opening of the defect channel 105 may also be provided to be smaller and smaller in the direction away from the substrate 101. In addition, a cross-section of the defect channel 105 in a direction parallel to the substrate 101 may be circular, elliptical, square, etc., or of any other shape. A shape of the defect channel 105 is not limited in the present disclosure.

Figure 2:
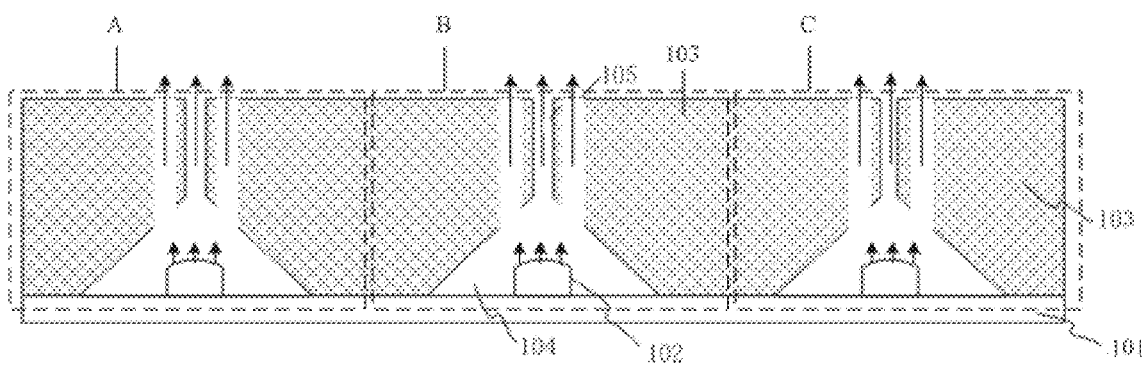
FIG. 2 illustrates a schematic diagram of a structure of a backlight module according to another embodiment of the present disclosure.

According to the embodiment of the present disclosure, in FIG. 1, only one defect channel 105 is provided in each of the light emitting areas. It should be understood that in practical applications, in order to increase the amount of light emergent from the backlight module, each of the light emitting areas may be provided with a plurality of defect channels 105. According to the embodiment of the present disclosure, as illustrated in FIG. 2, for example three defect channels 105 are provided in each of the light emitting areas. As compared with the structure in FIG. 1, the structure illustrated in FIG. 2 can increase the amount of light emergent from the backlight module. It should be understood that FIGS. 1 and 2 merely illustrate the structure of the backlight module according to the embodiment of the present disclosure, rather than limiting the number of the defect channels 105.

Further, according to the embodiment of the present disclosure, a extension direction of the defect channel 105 in the backlight module may be perpendicular to a surface of the substrate 101. Since the extension directions of the each of the defect channels 105 are parallel to each other, by setting the extension direction of the defect channel 105 to be perpendicular to the surface of the substrate 101, the extension directions of each of the defect channels 105 can be perpendicular to the surface of the substrate 101. In other words, the extension directions of the defect channels 105 are perpendicular to the light emergent surface of the light source 102, so that the light emergent in the direction perpendicular to the surface of the substrate 101 and is collimated.

According to the embodiment of the present disclosure, the smaller a size of the opening, on the side of the defect channel 105 away from the substrate 101, of the detect channel 105, the better the collimation of the light emitted from the backlight module. Specifically, in the backlight module, the size of the opening, on the side of the defect channel 105 away from the substrate 101, of the detect channel 105 for example may be less than about 3 μm, and preferably between about 700 nm and about 1 μm. Since the manufacturing process will be more difficult when the size of the opening of the defect channel 105 is too small, the opening, on the side of the defect channel 105 away from the substrate 101, of the detect channel 105 may be preferably between about 700 nm and about 1 μm. This can ensure that the light emergent from the backlight module has a better collimation while the defect channel 105 is manufactured easily.

According to the embodiment of the present disclosure, as illustrated in FIGS. 1 and 2, in the backlight module, a cross-sectional area of the cavity 104 in the direction parallel to the substrate 101 may be gradually decreased in the direction away from the substrate 101.

Figure 3:
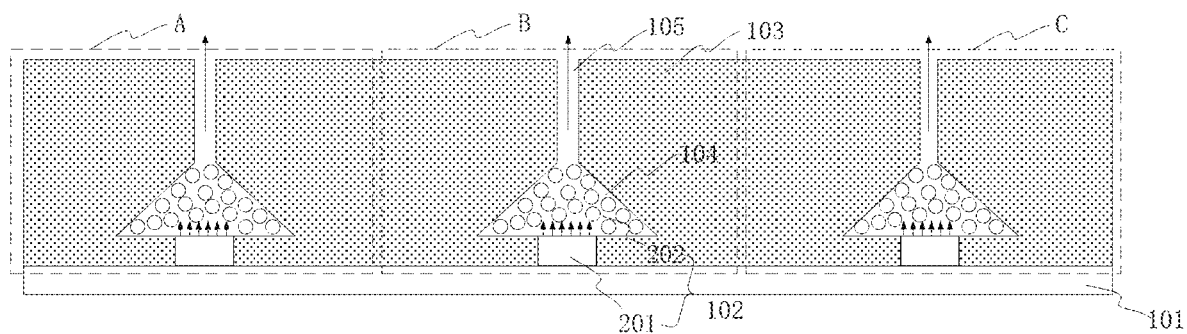
FIG. 3 illustrates a schematic diagram of a structure of a backlight module according to still another embodiment of the present disclosure.

According to the embodiment of the present disclosure, as illustrated in FIG. 3, a cross-sectional area of a portion of the cavity 104 above the light emergent surface of the light source 102 in a direction parallel to the substrate 101 may be gradually decreased in a direction away from the substrate 101. In order to accommodate the light source 102, a portion of the cavity 104 below the light emergent surface of the light source 102 may be any shape that matches the light source 102. It should be understood that the cross-sectional area of the whole cavity 104 (i.e., the portions above and below the light emergent surface of the light source 102) in the direction parallel to the substrate 101 may also be set as being gradually decreased in the direction away from the substrate 101. By setting the cavity 104 in such a structure, it ensures that emergent light of the light source 102 can emergent from the defect channel 105 after being reflected at limited times in the cavity 104. In this way, it prevents light in certain direction always reflects back and forth in the cavity 104 and cannot emergent from the defect channel 105, thereby ensuring the light extraction efficiency of the light source 102.

Figure 4:
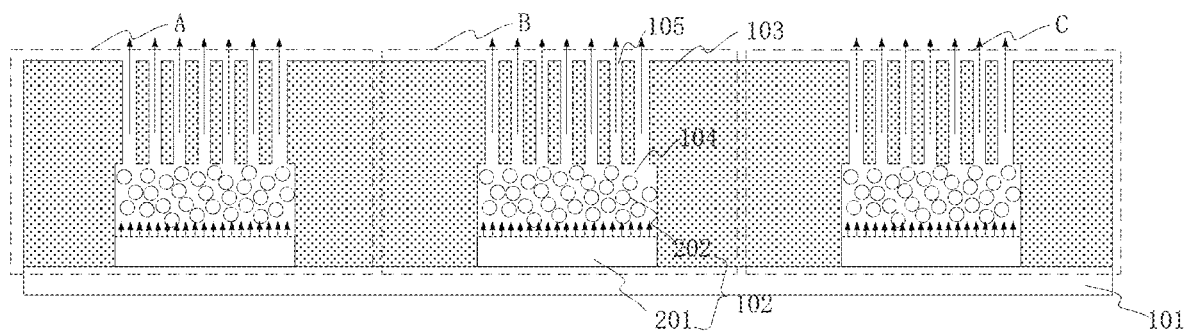
FIG. 4 illustrates a schematic diagram of a structure of a backlight module according to yet another embodiment of the present disclosure.

According to the embodiment of the present disclosure, as illustrated in FIG. 4, the cross-section of the whole cavity 104 for example may also be rectangular in a direction perpendicular to the substrate 101. That is to say, the cross-sectional area of the whole cavity 104 in the direction parallel to the substrate 101 is always uniform in the direction away from the substrate 101. If light is emergent in a direction parallel to the substrate 101, the light always reflects in this direction back and forth and cannot emergent from the defect channel 105, thereby reducing the light extraction efficiency of the light source 102.

It should be noted that in FIGS. 1 to 3, illustrations are made with an example that the portion of the cavity 104 above the light emergent surface of the light source 102 is triangular in a direction perpendicular to the substrate 101. It should be understood that in practical applications, the portion of the cavity 104 above the light emergent surface of the light source 102 may also have other shape, which is not limited herein.

Specifically, according to the embodiment of the present disclosure, emergent light of the light source 102 in the backlight module may be monochromatic light or compound light.

According to the embodiment of the present disclosure, if emergent light of the light source 102 is monochromatic light, as illustrated in FIGS. 1 to 4, emergent light of the light source 102 in the light emitting area A for example may be set as red light, emergent light of the light source 102 in the light emitting area B for example may be set as green light, and emergent light of the light source 102 in the light emitting area C for example may be set as blue light. By controlling luminous intensities of the light sources 102 in the respective light emitting areas, the emergence of light with various colors can be achieved. In addition, the light emitting area may be set to be matched with the size of the sub-pixel in the display panel. Since light with various colors can emergent from the backlight module, the color filter layer on the display panel can be omitted. The processes and materials for manufacturing the display panel can be reduced, thereby saving the cost. It should be understood that this is only an example, and in practical applications, the light emitting areas may also be set to emit light of other colors. For example, emergent light of the light sources in all the light emitting areas may be purple. The colors of the emergent light of the respective light sources 102 are not limited in the present disclosure.

According to the embodiment of the present disclosure, if the emergent light of the light source 102 is compound light, a white light source 102 composed of three colors of red, green and blue may also be provided in the light emitting area, so that the backlight module is applicable to various display panels. It should be understood that in practical applications, the light source 102 may also emit other compound light (such as orange light) based on the actual need, and the color of the compound light is not limited herein.

More specifically, according to the embodiment of the present disclosure, as illustrated in FIGS. 3 and 4, the light source 102 in the backlight module may comprise: an excitation light source 201 provided inside the cavity 104, and quantum dots 202 on a side of a light emergent surface of the excitation light source 201.

According to the embodiment of the present disclosure, the light source 102 is set to comprise the excitation light source 201 and quantum dots 202 on the side of the light emergent surface of the excitation light source 201, i.e., the light source 102 is set as a quantum dots light-emitting light source 102. This setting allows the light emergent from the backlight module to have a high color gamut and to be collimated. It should be understood that setting the light source 102 as a quantum dots light-emitting light source 102 is a preferred implementation of the embodiment of the present disclosure. In specific implementation, the light source 102 may be of any type, such as an LED light source 102, or an OLED light source 102, etc., which is not limited herein.

According to the embodiment of the present disclosure, in specific implementation, the quantum dots 202 may emit monochromatic light or compound light. According to the embodiment of the present disclosure, when emitting monochromatic light, the quantum dots 202 may be red quantum dots 202, green quantum dots 202, or blue quantum dots 202, etc. According to the embodiment of the present disclosure, when emitting compound light, the quantum dots 202 may be a mixture of red, green and blue quantum dots 202. These are just examples rather than limitations to the specific color of the quantum dots 202.

According to the embodiment of the present disclosure, in practical applications, the excitation light source 201 in the backlight module may be preferably for example a Ultraviolet Light Emitting Diode (LED). If the excitation light source 201 is set as an ultraviolet light emitting diode and the quantum dots 202 emit visible light, the excitation light source 201 can excite various colors quantum dots 202. It should be understood that the excitation light source 201 may also be specifically set according to the quantum dots 202 as long as the frequency of the emergent light of the excitation light source 201 is greater than that of the emergent light of the quantum dot 202. For example, if the quantum dots 202 are red quantum dots, the excitation light source 201 may be set to emit blue light, purple light and the like. In addition, the excitation light source 201 may also be set as any device other than a light emitting diode, such as an organic light-emitting diode (OLED) and so on. The color and the type of the excitation light source 201 are not limited herein.

According to the embodiment of the present disclosure, the material of the quantum dot 202 is generally granular or fluid. In one exemplary embodiment, if the material of the quantum dot 202 is granular, the size of the grain may range from about 2 nm to about 20 nm. For example, the size of the material of the blue quantum dot is about 2 nm, the size of the material of the green quantum dot is about 5 nm, and the size of the material of the red quantum dot is about 8 nm. For quantum dots 202 having such a material, when the backlight module is flipped or shook, the grains in the quantum dots 202 can easily leak out through the defect channel 105. In another exemplary embodiment, if the material of the quantum dot 202 is fluid, it can also easily flow out through the defect channel 105 when the backlight module is flipped or shook. Thus, in order to prevent the material of the quantum dot 202 from leaking out or flowing out through the defect channel 105 when the backlight module is flipped or shook, it is preferable to fill the defect channel 105 with the transparent material as described above.

Figure 5:
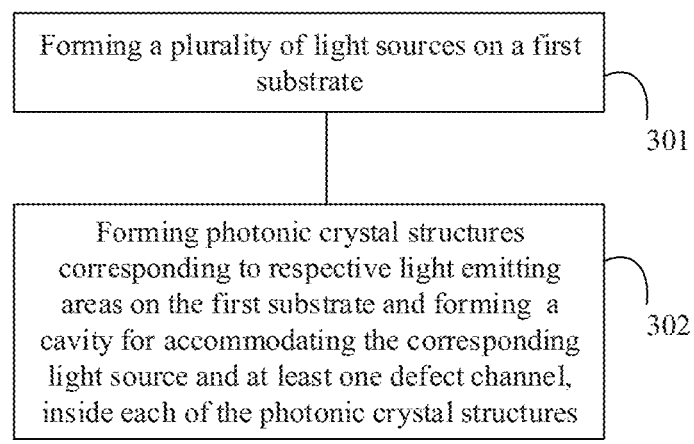
FIG. 5 illustrates a flowchart of a method for manufacturing a backlight module according to an embodiment of the present disclosure.
Figure 7A:
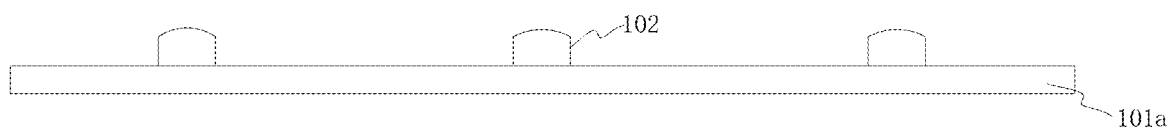
FIG. 7a to FIG. 7f illustrate schematic diagrams of structures of backlight modules manufactured by a method according to an embodiment of the present disclosure.
Figure 7B:
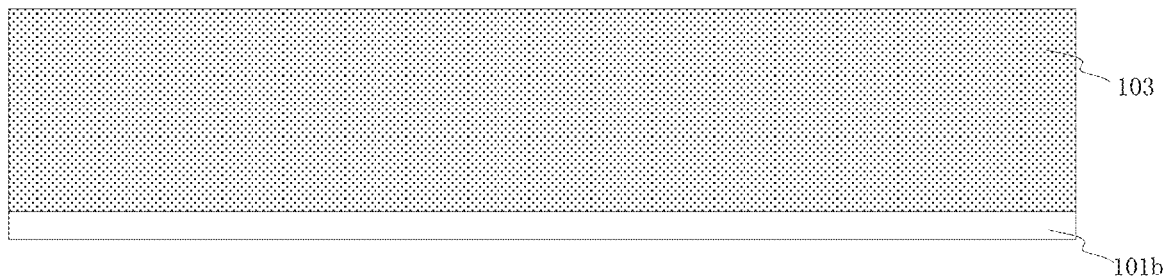
Figure 7C:
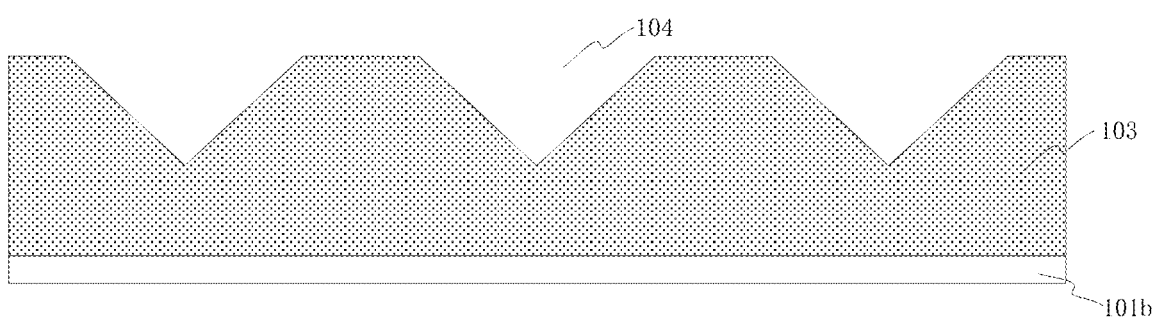
Figure 7D:
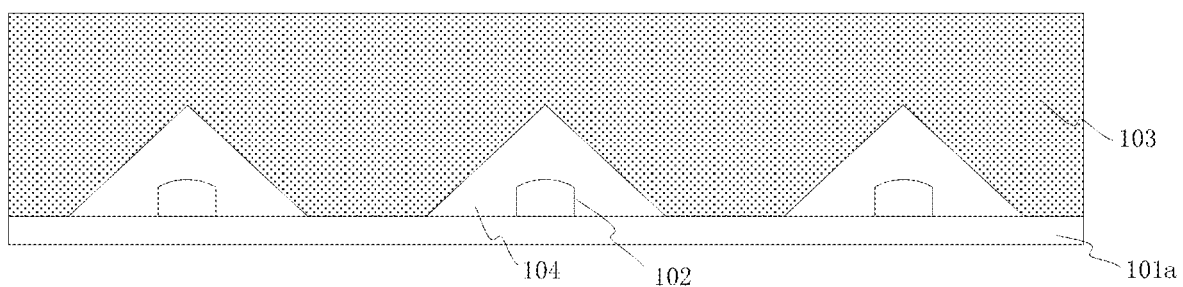
Figure 7E:
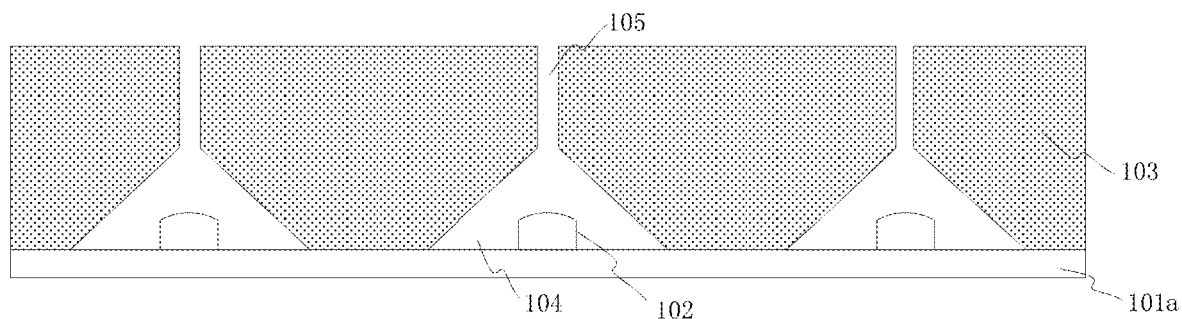

Based on the same inventive concept, the embodiments of the present disclosure further provide a method for manufacturing the above backlight module. Since the principle of the method for solving the problem is similar to that of the backlight module, the implementation of the method can refer to the implementation of the backlight module, and the repeated content is omitted. As illustrated in FIG. 5, the method may comprise the following steps:

S301: forming a plurality of light sources 102 on a first substrate 101a, as illustrated in FIG. 7a;

S302: forming photonic crystal structures 103 corresponding to respective light emitting areas on the first substrate 101a, and forming, a cavity 104 for accommodating the corresponding light source 102 and at least one defect channel 105, inside each of the photonic crystal structures 103, as illustrated in FIG. 7e, wherein, the defect channel 105 is configured to connect the cavity 104 and a surface, on a side of the photonic crystal structure 103 away from the first substrate 101a, of the photonic crystal structure 103, and extension directions of each of the defect channels 105 are parallel to each other;

a frequency of emergent light of each of the light sources 102 is within a photonic forbidden band of the corresponding photonic crystal structure 103.

By taking the manufacturing of the structure of the backlight module illustrated in FIG. 1 as an example, the implementation of step S302 will be described in details as follows with reference to the drawings.

Figure 6:
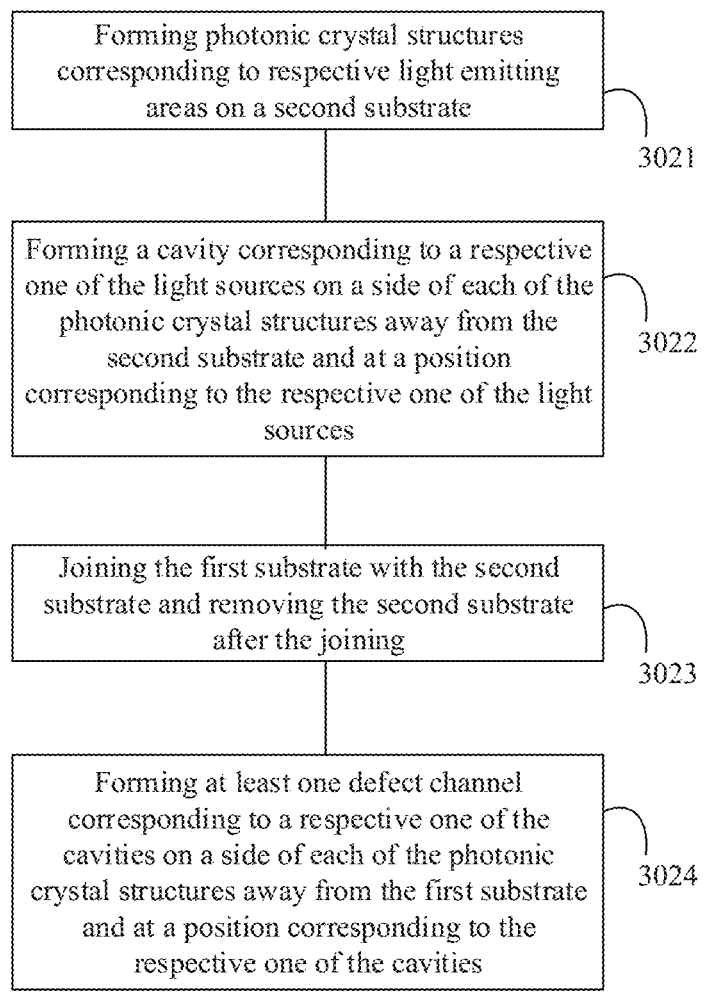
FIG. 6 illustrates a flowchart of a method for manufacturing a backlight module according to another embodiment of the present disclosure.

Implementation 1:

As illustrated in FIG. 6, the above step S302 may specifically comprise the following steps:

S3021: forming photonic crystal structures 103 corresponding to respective light emitting areas on a second substrate 101b, as illustrated in FIG. 7b; in the forming process, the photonic crystal structures 103 corresponding to the respective light emitting areas can be simultaneously formed.

S3022: forming a cavity 104 corresponding to a respective one of the light sources 102 on a side of each of the photonic crystal structures 103 away from the second substrate 101b and at a position corresponding to the respective one of the light sources 102, as illustrated in FIG. 7c. In this way, in the subsequent step of joining the first substrate 101a with the second substrate 101b, the light source 102 can be located just inside the corresponding cavity 104, as illustrated in FIG. 7d. In this implementation, since the second substrate 101b is firstly formed with the photonic crystal structure 103 and then joined with the first substrate 101a, the cross-section of the cavity 104 formed on the second substrate 101b is inversely triangular.

S3023: joining the first substrate 101a with the second substrate 101b, and removing the second substrate 101b after the joining. As illustrated in FIG. 7d, after the first substrate 101a is joined with the second substrate 101b, each of the light sources 102 is located just inside the cavity 104. If the light source 102 employs a quantum dot light-emitting light source, the material of the quantum dot needs to be pre-filled inside the cavity 104 before the joining, and then the second substrate 101b is removed after the joining.

S3024: forming at least one defect channel 105 corresponding to a respective one of the cavities 104, on a side of each of the photonic crystal structures 103 away from the first substrate 101a and at a position corresponding to the respective one of the cavities 104, as illustrated in FIG. 7e.

In the above Implementation 1, the cavity 104 is formed before the first substrate 101a is joined with the second substrate 101b, and the defect channel 105 is formed after the first substrate 101a is joined with the second substrate 101b, so that the etching depth of the defect channel 105 is small, and the manufacturing process can be easily achieved.

Figure 7F:
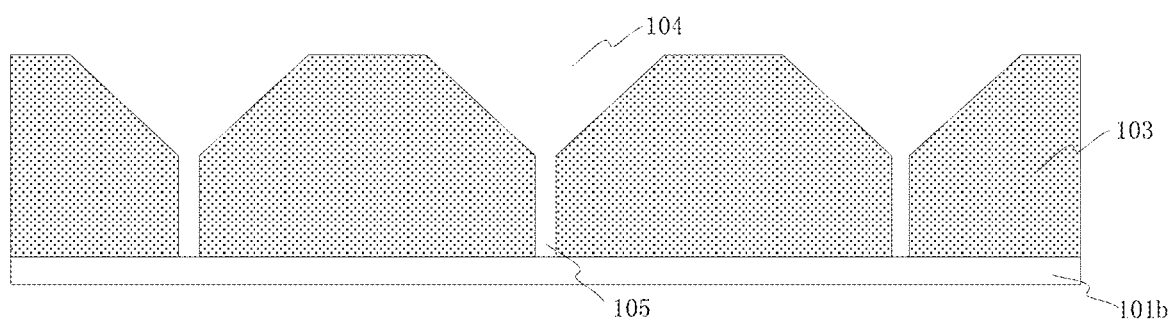
Figure 8:
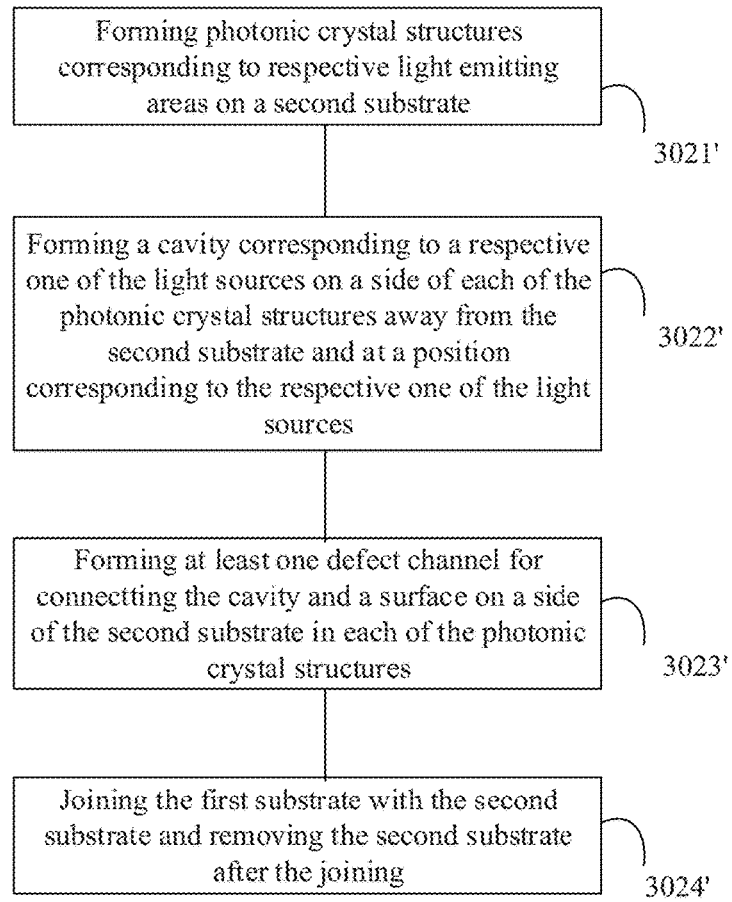
FIG. 8 illustrates a flowchart of a method for manufacturing a backlight module according to still another embodiment of the present disclosure.

Implementation 2:

As illustrated in FIG. 8, the above step S302 may specifically comprise the following steps:

S3021': forming photonic crystal structures 103 corresponding to respective light emitting areas on a second substrate 101b, also referring to FIG. 7b;

S3022': forming a cavity 104 corresponding to a respective one of the light sources 102, on a side of each of the photonic crystal structures 103 away from the second substrate 101b and at a position corresponding to the respective one of the light sources 102, also referring to FIG. 7c;

S3023': forming at least one defect channel 105 for connecting the cavity 104 and a surface on a side of the second substrate 101b in each of the photonic crystal structures 103, as illustrated in FIG. 7f. Therefore, the defect channel 105 can be manufactured before the first substrate 101a and the second substrate 101b are joined;

S3024': joining the first substrate 101a with the second substrate 101b, and removing the second substrate 101b after the joining, referring to FIG. 7e.

The difference between implementation 2 and implementation 1 as follows: in Implementation 1, the cavity 104 is formed before the first substrate 101a is joined with the second substrate 101b, and the defect channel 105 is formed after the joining; in Implementation 2, the cavity 104 and the corresponding defect channel 105 are formed before the joining. In addition, in Implementation 1, an etching depth of the defect channel 105 is small, and the manufacturing process can be easily achieved; while in Implementation 2, since the defect channel 105 is formed before the joining, the positions of the defect channel 105 and the corresponding cavity 104 can be easily corresponding to each other.

Specifically, in the step S3021 or step S3021', the photonic crystal structure 103 may be manufactured in the following two ways:

Manufacturing 1:

On the second substrate, forming photonic crystal structures formed by two materials with different refractive indexes alternately arranged in a one-dimensional direction at a specific cycle. The photonic crystal structure may be a film-like photonic crystal structure.

Figure 9A:
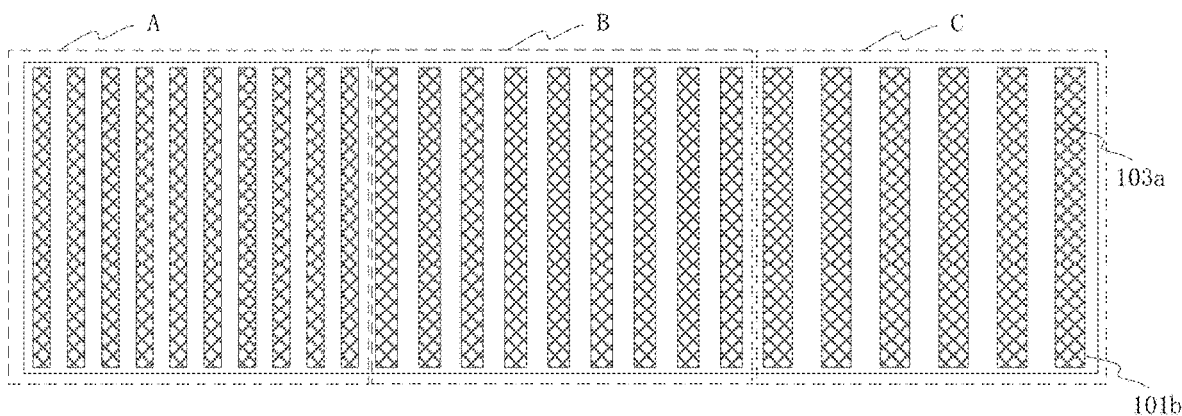
FIG. 9a and FIG. 9b illustrate schematic diagrams of photonic crystal structures manufactured by a method according to an embodiment of the present disclosure.

As illustrated in FIG. 9a, a pattern formed by a first material, i.e., the pattern denoted by 103a in FIG. 9a, is firstly formed on the second substrate 101b. The pattern is preferably composed of stripe structures arranged according to a specific rule, and an etching process may be adopted to form a groove between the stripe structures. If the colors of light emitted from the respective light emitting areas are the same, the stripe structures in the respective light emitting areas have the same size and spacing, i.e., the arrangement periods of the stripe structures in the respective light emitting areas are the same. If the colors of light emitted from the respective light emitting areas are different, the stripe structures in the respective light emitting areas may have different sizes and spacings, i.e., the arrangement periods of the stripe structures in the respective light emitting areas are different. For example, in FIG. 9a, the width and spacing of the stripe structures in the light emitting area A are smaller than those of the stripe structures in the light emitting area B, and the width and spacing of the stripe structures in the light emitting area B are smaller than those of the stripe structures in the emitting area C. The sizes and spacings of the stripe structures in the respective light emitting areas may be set as required, which are not limited in the present disclosure.

Figure 9B:
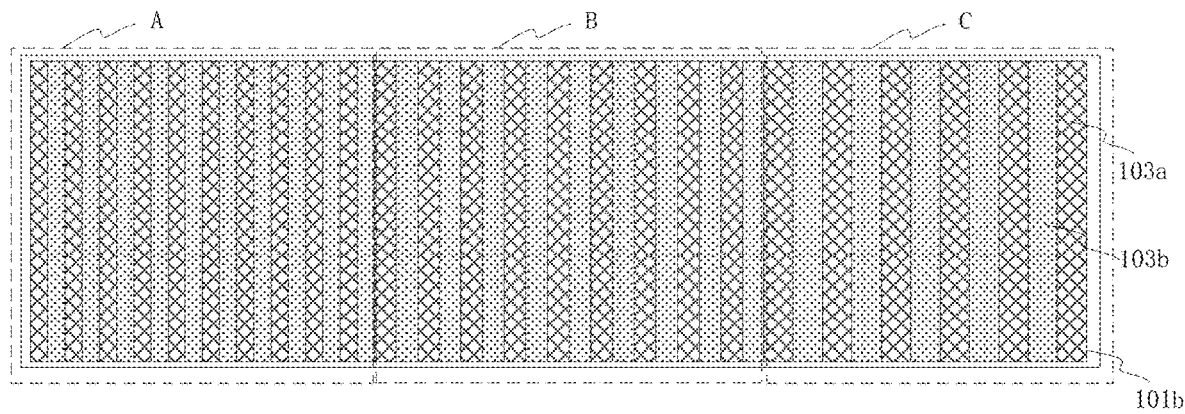

As illustrated in FIG. 9b, a pattern formed by a second material, i.e., the pattern denoted by 103b in FIG. 9b, is formed in the groove between the stripe structures in the pattern formed by the first material on the second substrate 101b. Through the above steps, a photonic crystal structure is formed by the first material and the second material alternately arranged.

Manufacturing 2:

On the second substrate, forming photonic crystal structures formed by two materials with different refractive indexes alternately arranged in two-dimensional directions at a specific cycle. The photonic crystal structure may be a film-like photonic crystal structure.

Figure 10A:
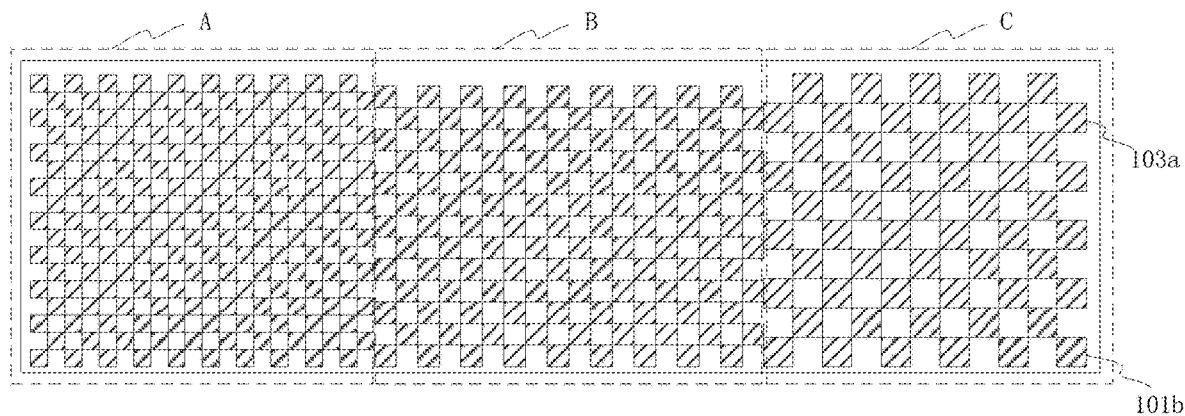
FIG. 10a and FIG. 10b illustrate schematic diagrams of photonic crystal structures manufactured by a method according to another embodiment of the present disclosure.

As illustrated in FIG. 10a, being similar to Manufacturing 1, a pattern formed by the first material, i.e., the pattern denoted by 103a in FIG. 10a, is formed on the second substrate 101b. The pattern is preferably composed of block structures arranged according to a specific rule, and an etching process may be adopted to form a groove between the block structures. If the colors of light emitted from the respective light emitting areas are the same, the block structures in the pattern have the same size and spacing, i.e., the arrangement periods of the block structures in the respective light emitting areas are the same. If the colors of light emitted from the respective light emitting areas are different, the block structures in the respective light emitting areas may have different sizes and spacings, i.e., the arrangement periods of the block structures in the respective light emitting areas are different. For example, in FIG. 10a, the sizes and spacings of the block structures in the light emitting area A are smaller than those of the block structures in the light emitting area B, and the sizes and spacings of the block structures in the light emitting area B are smaller than those of the block structures in the emitting area C. The sizes and spacings of the block structures in the respective light emitting areas may be set as required, which are not limited in the present disclosure.

Figure 10B:
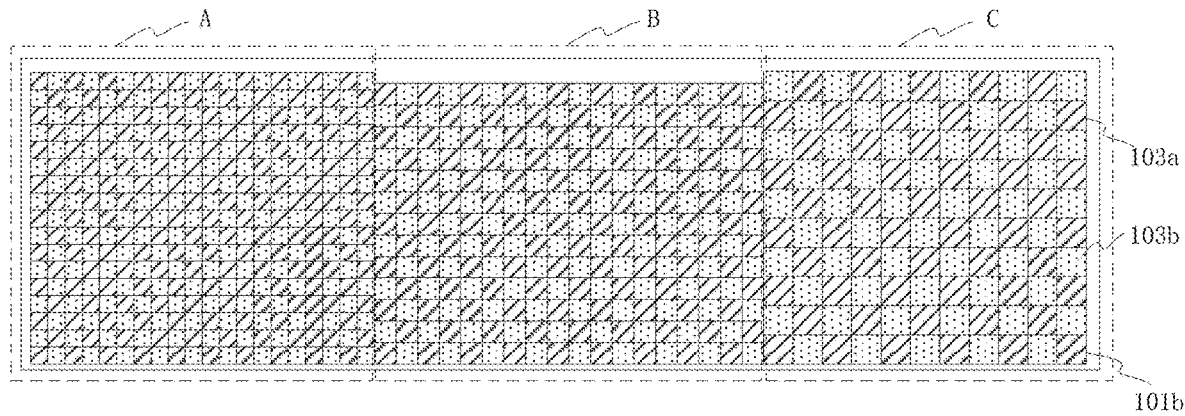

As illustrated in FIG. 10b, a pattern formed by the second material, i.e., the pattern denoted by 103b in FIG. 10b, is formed in the groove between the block structures of the pattern formed by the first material on the second substrate 101b. Through the above steps, a photonic crystal structure is formed by the first material and the second material alternately arranged.

In the Manufacturing 1 and 2, a photonic crystal structure which formed by two materials alternately arranged can be formed in a direction parallel to the substrate. In this method, a microstructure with a dielectric constant varying periodically with space can be obtained just by manufacturing the two materials into one layer. Therefore, the process for manufacturing the photonic crystal structure is simple, and the resulting backlight module is thin, which can save the cost.

It should be understood that the photonic crystal structures which formed by two materials periodically arranged may also be formed in a direction perpendicular to the substrate, but more layers need to be manufactured, the manufacturing process is complicated, and the cost is high. In addition, the photonic crystal structures which formed by materials periodically arranged may also be formed in the three-dimensional directions, and the process of such structure is more complicated. Thus, these several ways may be not used as preferred implementations of the embodiments of the present disclosure.

In addition, a photonic crystal structure which formed by three or more materials with different refractive indexes arranged alternately at a specific cycle may also be formed on the second substrate.

Figure 11:
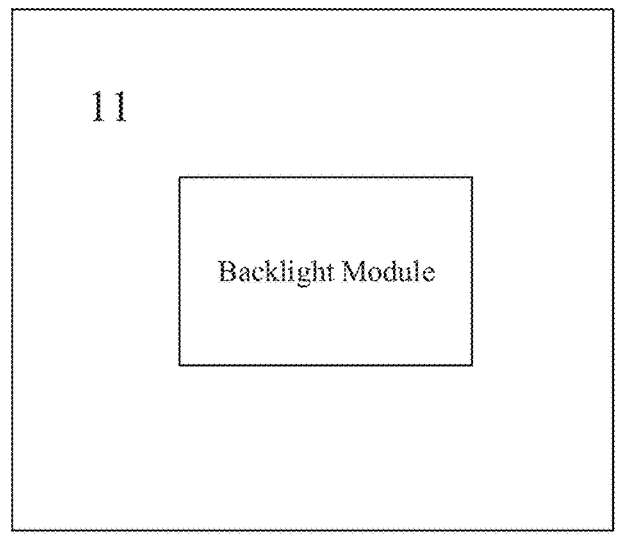
FIG. 11 illustrates a schematic diagram of a display device according to an embodiment of the present disclosure.

Based on the same invention concept, according to the embodiments of the present disclosure, there is further provided a display device 11 as illustrated in FIG. 11. The display device 11 may comprise the above backlight module. The display device 11 may be applied to any product or component with a display capability, such as mobile phone, tablet PC, television, display, notebook computer, digital photo frame, navigator and the like. Since the principle of the display device 11 for solving the problem is similar to that of the backlight module, the implementation of the display device 11 may refer to the implementation of the backlight module, and the repeated content will not be repeated.

Regarding the backlight module, the method for manufacturing the same, and the display device provided by the embodiments of the present disclosure, since the frequency of the emergent light of each of the light sources is within the photonic forbidden band of the corresponding photonic crystal structure, the emerge light of each of the light sources can only emergent from the defect channel, rather than the corresponding photonic crystal structure. Since the extension directions of each of the defect channel are parallel to each other, the light emergent from the backlight module is collimated. In addition, by using the quantum dot light-emitting light source as the light source, the light emergent from the backlight module can have a high color gamut and be collimated.

It is obvious that a person skilled in the art can make various changes and modifications to the present disclosure without deviating from the spirit and scope of the present disclosure. In this way, if these changes and modifications to the present disclosure fall within the scope of the claims and equivalent technologies thereof in the present disclosure, the present disclosure is also intended to include these changes and modifications.

What is claimed is:

1. A backlight module, comprising: a substrate and a plurality of light emitting areas provided on the substrate, wherein,
   the light emitting area comprises a light source and a photonic crystal structure corresponding to the light source;
   the photonic crystal structure is internally provided with a cavity for accommodating a corresponding light source, and at least one defect channel, wherein the at least one defect channel connect the cavity and a surface of the photonic crystal structure, on a side of the photonic crystal structure away from the substrate;
   a frequency of emergent light of each of the light sources is within a photonic forbidden band of a corresponding photonic crystal structure;
   wherein extension directions of each of the defect channels are parallel to each other.

2. The backlight module according to claim 1, wherein the extension direction of the defect channel is perpendicular to a surface of the substrate.

3. A method for manufacturing the backlight module according to claim 2, comprising:
   forming a plurality of light sources corresponding to respective light emitting areas on a first substrate; and
   forming photonic crystal structures corresponding to a respective light emitting areas on the first substrate, and forming a cavity for accommodating the corresponding light source and at least one defect channel inside each of the photonic crystal structures, wherein,
   the defect channel is configured to connect the cavity and a surface, on a side of the photonic crystal structure away from the first substrate, of the photonic crystal structure, and extension directions of each of the defect channels are parallel to each other;
   a frequency of emergent light of each of the light sources is within a photonic forbidden band of a corresponding photonic crystal structure.

4. The backlight module according to claim 1, wherein a size of an opening of the detect channel, on a side of the defect channel away from the substrate, is less than about 3 µm.

5. A method for manufacturing the backlight module according to claim 4, comprising:
   forming a plurality of light sources corresponding to respective light emitting areas on a first substrate; and
   forming photonic crystal structures corresponding to the respective light emitting areas on the first substrate, and forming a cavity for accommodating a corresponding light source and at least one defect channel inside each of the photonic crystal structures, wherein,
   the defect channel is configured to connect the cavity and a surface, on a side of the photonic crystal structure away from the first substrate, of the photonic crystal structure, and extension directions of each of the defect channels are parallel to each other;
   a frequency of emergent light of each of the light sources is within a photonic forbidden band of a corresponding photonic crystal structure.

6. The backlight module according to claim 1, wherein a cross-sectional area of at least a part of the cavity in a direction parallel to the substrate is gradually decreased in a direction away from the substrate.

7. A method for manufacturing the backlight module according to claim 6, comprising:
   forming a plurality of light sources corresponding to respective light emitting areas on a first substrate; and
   forming photonic crystal structures corresponding to the respective light emitting areas on the first substrate, and forming a cavity for accommodating a corresponding light source and at least one defect channel inside each of the photonic crystal structures, wherein,
   the defect channel is configured to connect the cavity and a surface, on a side of the photonic crystal structure away from the first substrate, of the photonic crystal structure, and extension directions of each of the defect channels are parallel to each other;
   a frequency of emergent light of each of the light sources is within a photonic forbidden band of a corresponding photonic crystal structure.

8. The backlight module according to claim 1, wherein the emergent light of the light source comprises monochromatic light or compound light.

9. The backlight module according to claim 8, wherein the light source comprises an excitation light source provided inside the cavity, and quantum dots provided on a side of a light emergent surface of the excitation light source.

10. The backlight module according to claim 9, wherein the quantum dots comprise quantum dots that emit monochromatic light or quantum dots that emit compound light.

11. The backlight module according to claim 10, wherein the defect channel is filled with a transparent material.

12. The backlight module according to claim 9, wherein the excitation light source is an ultraviolet light emitting diode.

13. A method for manufacturing the backlight module according to claim 1, comprising:
   forming a plurality of light sources corresponding to respective light emitting areas on a first substrate; and forming photonic crystal structures corresponding to the respective light emitting areas on the first substrate and forming a cavity for accommodating a corresponding light source and at least one defect channel inside each of the photonic crystal structures, wherein, the defect channel is configured to connect the cavity and a surface, on a side of the photonic crystal structure away from the first substrate, of the photonic crystal structure, and extension directions of each of the defect channels are parallel to each other;

a frequency of emergent light of each of the light sources is within a photonic forbidden band of a corresponding photonic crystal structure.

14. The method according to claim 13, wherein forming photonic crystal structures corresponding to the respective light emitting areas on the first substrate, and forming a cavity for accommodating the corresponding light source and at least one defect channel inside each of the photonic crystal structures comprises:

forming photonic crystal structures corresponding to the respective light emitting areas on a second substrate;

forming a cavity corresponding to a respective one of the light sources, on a side of each of the photonic crystal structures away from the second substrate and at a position corresponding to the respective one of light sources;

joining the first substrate with the second substrate, and removing the second substrate after the joining;

forming at least one defect channel corresponding to a respective one of the cavities, on a side of each of the photonic crystal structures away from the first substrate and at a position corresponding to the respective one of the cavities.

15. The method according to claim 14, wherein forming photonic crystal structures corresponding to the respective light emitting areas on a second substrate comprises:

forming photonic crystal structures formed by at least two materials with different refractive indexes alternately arranged in a one-dimensional direction at a specific cycle on the second substrate.

16. The method according to claim 14, wherein forming photonic crystal structures corresponding to the respective light emitting areas on a second substrate comprises:

forming photonic crystal structures formed by at least two materials with different refractive indexes alternately arranged in two-dimensional directions at a specific cycle on the second substrate.

17. The method according to claim 13, wherein forming photonic crystal structures corresponding to the respective light emitting areas on the first substrate and forming a cavity for accommodating the corresponding light source and at least one defect channel inside each of the photonic crystal structures comprises:

forming photonic crystal structures corresponding to the respective light emitting areas on a second substrate;

forming a cavity corresponding to a respective one of the light sources, on a side of each of the photonic crystal structures away from the second substrate and at a position corresponding to the respective one of the light sources;

forming at least one defect channel for connecting the cavity and the second substrate in each of the photonic crystal structures;

joining the first substrate with the second substrate and removing the second substrate after the joining.

18. The method according to claim 17, wherein forming photonic crystal structures corresponding to the respective light emitting areas on a second substrate comprises:

forming photonic crystal structures which formed by at least two materials with different refractive indexes alternately arranged in a one-dimensional direction at a specific cycle on the second substrate.

19. The method according to claim 17, wherein forming photonic crystal structures corresponding to the respective light emitting areas on a second substrate comprises:

forming photonic crystal structures which formed by at least two materials with different refractive indexes alternately arranged in two-dimensional directions at a specific cycle on the second substrate.

20. A display device, comprising the backlight module according to claim 1.

* * * * *